United States Patent
Haruyama

(10) Patent No.: US 9,393,834 B2
(45) Date of Patent: Jul. 19, 2016

(54) ADHESIVE FILM LAMINATE FOR WHEEL PROTECTION

(71) Applicant: SUMIRON CO., LTD., Osaka (JP)

(72) Inventor: Eiji Haruyama, Osaka (JP)

(73) Assignee: SUMIRON CO., LTD., Osaka (JP)

(*) Notice: Subject to any disclaimer, the term of this patent is extended or adjusted under 35 U.S.C. 154(b) by 230 days.

(21) Appl. No.: 14/342,803

(22) PCT Filed: Nov. 1, 2012

(86) PCT No.: PCT/JP2012/078272
§ 371 (c)(1),
(2) Date: Mar. 5, 2014

(87) PCT Pub. No.: WO2013/073375
PCT Pub. Date: May 23, 2013

(65) Prior Publication Data
US 2014/0290844 A1     Oct. 2, 2014

(30) Foreign Application Priority Data

Nov. 18, 2011  (JP) .................................. 2011-253354

(51) Int. Cl.
| | | |
|---|---|---|
| *B29C 65/48* | (2006.01) | |
| *B29C 65/52* | (2006.01) | |
| *B32B 37/12* | (2006.01) | |
| *B32B 37/26* | (2006.01) | |
| *B32B 38/10* | (2006.01) | |
| *B60B 7/06* | (2006.01) | |
| *B60B 7/00* | (2006.01) | |
| *C09J 7/02* | (2006.01) | |

(52) U.S. Cl.
CPC ... *B60B 7/06* (2013.01); *B60B 7/00* (2013.01); *C09J 7/026* (2013.01); *C09J 7/0232* (2013.01); *B60B 7/0073* (2013.01); *B60B 2310/242* (2013.01); *B60B 2310/318* (2013.01); *B60B 2900/212* (2013.01); *B60B 2900/5112* (2013.01); *B60B 2900/572* (2013.01); *C09J 2201/20* (2013.01); *Y10T 428/1476* (2015.01)

(58) Field of Classification Search
USPC .......................................... 156/247, 249, 289
See application file for complete search history.

(56) References Cited

U.S. PATENT DOCUMENTS 5,039,172 A * 8/1991 Krieger .................... B60B 7/02
                                                                       118/505

FOREIGN PATENT DOCUMENTS

| CN | 1324298 A | 11/2001 |
|---|---|---|
| JP | 2001117495 A | 4/2001 |

(Continued)

OTHER PUBLICATIONS

International Search Report for PCT/JP2012/078272 dated Feb. 5, 2013.

(Continued)

*Primary Examiner* — Sing P Chan
(74) *Attorney, Agent, or Firm* — Heslin Rothenberg Farley & Mesiti P.C.

(57) ABSTRACT

An adhesive film laminate for wheel protection results from peelably laminating a plurality of sheets of adhesive film having an adhesive layer on one surface thereof. A pull-piece is formed protruding out from at least a portion of the edge of the laminated covered sections, and the covered sections of the plurality of adhesive films overlap each other at approximately the same position. A cover material that covers the covered section of the surface sheet of adhesive film is peelably pasted to an adhesive agent layer at one surface of the surface sheet of adhesive film, and adjacent pull-pieces of at least a portion of the laminated adhesive films are laminated having an overlapping portion at all or a portion of the facing surfaces thereof.

12 Claims, 11 Drawing Sheets

(56) References Cited

FOREIGN PATENT DOCUMENTS

| | | |
|---|---|---|
| JP | 2002528298 A | 9/2002 |
| JP | 2003267001 A | 9/2003 |
| JP | 2010143350 A | 7/2010 |
| JP | 2010149643 A | 7/2010 |
| JP | 2012082275 A | 4/2012 |
| JP | 2012171731 A | 9/2012 |

OTHER PUBLICATIONS

Office Action issued in corresponding Chinese Patent Application No. CN103958629A dated Jan. 6, 2015.

* cited by examiner

ADHESIVE FILM LAMINATE FOR WHEEL PROTECTION

CROSS REFERENCE TO RELATED APPLICATIONS

This application is a national stage filing under section 371 of International Application No. PCT/JP2012/078272 filed on Nov. 1, 2012, and published in Japanese on May 23, 2013 as WO 2013/073375 A1 and claims priority of Japanese patent application No. 2011-253354 filed on Nov. 18, 2011, the entire disclosure of these applications being hereby incorporated herein by reference.

TECHNICAL FIELD

The present invention relates to an adhesive film laminate of an adhesive film for wheel protection that covers a wheel and an opening formed on the wheel side in an automobile (including a multi-wheeled vehicle such as a tricycle besides a four-wheeled vehicle and a motorcycle) in which tires are assembled to wheels or a pasting method or a supplying method for the adhesive film laminate.

BACKGROUND ART

As a rust preventing method and a rust preventing cover for a disk brake of an automobile, in Japanese Patent Application Laid-Open Publication No. 2003-267001, a rust preventing method and a rust preventing cover have been disclosed in which, after a tire assembly obtained by assembling a tire to an aluminum wheel is attached to a hub of an axle, a cover member covering the aluminum wheel is pasted to a side surface of the tire assembly via a peelable adhesive layer. This is a rust preventing method and a rust preventing cover in which, as a rust preventing cover for a disk brake of an automobile, a rust preventing cover including a cover member attached to a side surface of a tire assembly and covering the wheel and an adhesive section for peelably pasting the cover member to the side surface of the tire assembly is used. When an aluminum wheel is covered with such a cover member, intrusion of rain water, outdoor air containing salt content, and the like into a disk brake side through an opening is prevented. The cover member is pasted to the side surface of the tire assembly by the peelable adhesive layer. Therefore, workability is improved and a work time is substantially reduced. Since the cover member can be easily peeled, it is possible to collect the cover member without troubles. Further, when several hundred sheets of the cover members are supplied to an assembly line in a laminated state and peeled one by one and pasted to a side surface of a tire, stains on the adhesive layer can be prevented immediately before the pasting. Therefore, it is possible to prevent a pasting failure due to the stains. Packaging and management are facilitated (Japanese Patent Application Laid-Open Publication No. 2003-267001, paragraph 0026, FIG. 2).

SUMMARY OF INVENTION

Technical Problem

However, in the adhesive film laminate of the cover member in the past, it is not easy to peel the respective adhesive films off the adhesive film laminate one by one. This sometimes affects work efficiency of pasting. In pasting work, the thin cover members peeled one by one are transported close to a target surface of a wheel and then pasted to the target surface. Therefore, a certain degree of proficiency is required to paste the cover members to an appropriate position such that adhesive surfaces of the sheets do not stick to each other during the transportation and, after the pasting, the sheets are not wrinkled and displaced. Transportability and pasting work efficiency are not considered to be high.

Therefore, it is an object of the prevent invention to provide an adhesive film laminate for wheel protection that enables adhesive films to be easily peeled off the adhesive film laminate one by one, has predetermined form retention of the adhesive film laminate as a whole, and is covered with a pull-piece or a cover material and therefore has excellent transportability and pasting work efficiency.

Solution to Problem

In order to attain such an object, the present invention takes measures (1) to (7) explained below.

(1) An adhesive film laminate for wheel protection of the present invention is an adhesive film laminate for wheel protection of an automobile (including a motorcycle and an automatic four-wheel vehicle) having an adhesive layer on one surface and configured by peelably laminating a plurality of sheets of adhesive films having a shape for covering a wheel surface of the automobile, wherein, in the respective adhesive films, a pull-piece functioning as a pull margin in peeling the sheets one by one is formed protruding out from at least a portion of the edge of a covered section laminated by a base material layer and an adhesive layer, the covered sections of the plurality of adhesive films overlap each other in substantially the same positions and are laminated and integrated by the adhesive layers on the respective one surfaces, a cover material that covers the covered section of the surface sheet of the adhesive films is peelably pasted to the adhesive layer on the one surface of the surface sheet of the adhesive films, and adjacent pull-pieces of at least a portion of the laminated adhesive films are laminated having an overlapping portion in all or a portion of the facing surfaces thereof.

According to the configuration, it is possible to hold the pull-pieces, which serve as a start portion of a peeling position, one by one and easily peel the respective adhesive films off the adhesive film laminate one by one. Since the pull-pieces are laminated having the overlapping portions, the pull-pieces play a function of a grip during transportation or during pasting work. Since a large number of adhesive films and cover materials are laminated, the entire adhesive film laminate has sturdiness and is excellent in form retention. Since the cover material covers the adhesive layer of the surface sheet of the adhesive films, the adhesive film is prevented from unnecessarily adhering to surfaces other than a pasting surface during use. Transportability and pasting work efficiency of the adhesive film laminate are greatly improved by the pull-piece, the laminated configuration, and the cover material.

Among the respective sheets configuring the adhesive film laminate, at least any adjacent pull-pieces overlap each other in portions of respective piece shapes or overlap each other in the entire respective piece shapes. Consequently, when one adhesive film is peeled off the film laminate, it is possible to easily recognize the position of the next sheet of pull-piece in the residual film laminate. The adhesive film laminate can be configured compact by reducing a total area occupied by the laminated pull-piece group. Further, it is possible to reduce an amount of the piece protruding to the outside of the wheel after the pasting. Therefore, an appearance is improved and it is possible to suppress the adhesive film from unnecessarily peeling from the pull-piece portion because of an external contact or the like.

Note that the pull-piece is formed to project from one portion or a plurality of portions of the edge of the covered section further to the outer side than the covered section or above or below the covered section. The pull-piece may be integrally formed by the same base material layer continuous to the covered section or may be formed to be coupled and formed by a component separate from the covered section.

(2) It is preferable that, in the overlapping portions of the pull-pieces of the adhesive film laminate for wheel protection, at least one facing surface is formed of a non-adhesive surface not adhering or bonding to the other facing surface of the adjacent pull-pieces.

According to the configuration, since the facing surface of the overlapping portion of the pull-pieces is formed of the non-adhesive surface, the pull-pieces have a satisfactory dispersion property without adhering or bonding. Consequently, it is possible to hold the pull-pieces one by one and easily peel the respective adhesive films from the adhesive film laminate.

For example, a pull-piece in an embodiment explained below is formed of a base material layer integrally continuing to the covered section and having thickness substantially equal to the thickness of the covered section. The entire both surfaces configured in pieces are non-adhesive surfaces. The pull-piece does not have an adhesive layer on both the front and rear surfaces. In the covered section, an adhesive layer having predetermined thickness is formed as a layer on one surface of a base material layer. The total thickness of the covered section is larger than the total thickness of the pull-piece by the thickness of the layer. Consequently, in the pull-pieces overlapping each other, a separation distance equivalent to the thickness of the adhesive layer is formed between the adjacent pieces by adhesion and lamination of the covered section. That is, since both the surfaces of the pull-pieces are formed of non-adhesive surfaces not having an adhesive layer, the respective pieces are easily separated by a difference in thickness between the pull-pieces and the covered section.

(3) In the adhesive film laminate for wheel protection described in (1) or (2), in at least a portion of a region in the overlapping portion in the facing surfaces of one or both of the adjacent pull-pieces of the respective adhesive films, a separating treatment layer for increasing slippage with or a separation distance from the other facing surface may be formed.

According to the configuration, since the separating treatment layer is formed on the facing surface of the overlapping portion of the pull-pieces, the pull-pieces not only simply adhere or bond but also secure slippage or a separation distance each other to have a satisfactory dispersion property. Consequently, it is possible to grip the pull-pieces one by one and extremely easily peel the respective adhesive films off the adhesive film laminate.

In the present invention, the separating treatment layer means a surface layer applied with layer formation treatment or deformation treatment for increasing slippage with or an inter-facing surface distance from the other facing surface. The layer formation treatment means denaturation treatment for a surface for increasing a slippage degree with respect to the facing surface through, for example, formation of a releasing layer including acrylic resin. The deformation treatment means surface treatment of physical deformation for maintaining, through, for example, formation of a micro concave portion or a micro convex portion, an inter-facing surface distance larger than an original inter-facing surface distance when a position with respect to a facing surface is deviated.

For example, the micro concave portion and the micro convex portion are respectively formed in positions corresponding to respective pull-piece both surfaces by applying both surface embossing of a predetermined emboss pattern. When the pull-pieces are shifted from each other, the micro convex portion projected into the micro concave portion of the facing surface is disengaged from the concave portion to form a separation distance from the facing surface according to the shape of the micro convex portion (e.g., FIG. 6).

(4) In the adhesive film laminate for wheel protection described in any one of (1) to (3), it is preferable that, in the separating treatment layers of the respective adhesive films, a plurality of micro convex portions projecting to the facing surface side are formed in a front side region excluding a connecting section neighborhood region to the covered section in the overlapping portion of the pull-pieces.

For example, in second to fifth embodiments explained below, as one kind of the separating treatment, a large number of micro concave portions and convex portions by embossing are formed in front side regions on the front and back of the pull-piece. A formation region of the micro concave portions and convex portions are not the entire surface of the overlapping portion of the pull-pieces and is only a portion of a region on the front side excluding the connecting section neighborhood region to the covered section. Since the micro concave portions and convex portions are formed in a portion of the front side region excluding the connecting section neighborhood region, it is possible to secure connection strength of the pull-piece to the covered section.

The micro convex portion may be formed either on one surface or on both surfaces of the pull-piece. For example, a larger separation distance to the facing surface is retained by applying the concave portion and the convex portion corresponding to each other respectively to the front surface and the rear surface of the pull-piece (see, for example, FIG. 6). Consequently, dispersion of each one sheet becomes satisfactory and a pulling property is improved.

(5) In the adhesive film laminate for wheel protection described in any one of (1) to (4), the pull-pieces of the respective adhesive films may be formed in a piece shape including four sides made up of a connection side connected to the covered section, left and right sides adjacent to the connection side, and a distal end side, which is an opposed side of the connection side. Among the sides, both the left and right sides may be shorter than both of the connection side and the distal end side and piece width formed by the distance between the left and right sides may gradually increase from the side of the connection side to the side of the distal end side.

The pull-piece explained above is formed without largely projecting from the adhesive film, has a flat shape extending along finger width or finger length of a pasting operator, and has a shape extending in the width direction toward the front side. Therefore, the respective sheets can be easily separated. The pull-piece is excellent in a pulling property when being touched and shifted by a finger.

(6) A method of pasting an adhesive film to a wheel for an automobile of the present invention is a method of pasting adhesive films one by one to a pasting surface of a wheel of an automobile using the adhesive film laminate for wheel protection described in any one of (1) to (5), the pasting method including: a partial peeling step of holding a pull-piece of the bottom sheet of laminated adhesive films, partially peeling the bottom sheet of laminated adhesive films to turn back the bottom sheet of laminated adhesive films to an end on the opposite side of a pull-piece forming section at the end of a covered section, and partially exposing an adhesive layer of the bottom sheet of the adhesive films; a contact step of bringing the entire adhesive film laminate including the partially exposed adhesive layer of the adhesive film laminate after the partial peeling step close to a pasting position of the wheel and pasting the adhesive layer to a facing surface portion of the exposed portion on a pasting surface of the wheel of the automobile; and a shifting and pasting step of shifting the entire adhesive film laminate brought into contact with the pasting surface by the contact step to an end direction on the opposite side from the pasting position while keeping the adhesive film laminate in contact with the pasting surface to paste the residual adhesive layer of the bottom sheet of the adhesive films while exposing the adhesive layer to the pasting surface side starting from a pasting portion.

The adhesive films are not completely peeled off and separated from the adhesive film laminate one by one but are partially peeled up to the position where the pull-piece is turned back (in an embodiment, to a half on one side of an adhesive layer surface) according to the partial peeling step.

After the partial peeling step, a pull-piece group of the adhesive film laminate and the partially peeled bottom sheet of the pull-piece are located to be respectively separated on the left and right of a covered section group. In this state, since the adhesive film laminate includes the pull-piece group or the pull-pieces or laminated covered sections, it is possible to easily transport the adhesive film while keeping a state in which the adhesive layer portion exposed by the partial peeling is stuck on a lamination surface of a laminate.

According to the partial peeling step, the entire laminate is brought into contact with the pasting surface in the next contact step. Therefore, it is possible to easily paste the laminate to an accurate pasting position. Therefore, the adhesive surfaces less easily adhere to each other when peeled off from the laminate, the adhesive film is less easily wrinkled when being pasted to the pasting surface, and the pasting method is excellent in work efficiency.

Further, according to the shifting and pasting step for shifting and pasting the entire half-pasted laminate, it is possible to paste the residual adhesive layer portion, which is not exposed during the partial peeling step, in order simultaneously with peeling from the laminate. Therefore, since dust or the like less easily adheres and a peeling boundary portion is shifted in order, it is possible to easily realize a beautiful pasting state without causing wrinkles and an air pocket in the pasted adhesive film.

(7) A supplying method for an adhesive film of an adhesive film laminate for wheel protection of the present invention is a method of supplying the adhesive film of the adhesive film laminate for wheel protection described in any one of (1) to (6), the supplying method including peeling and removing a cover material of one adhesive film laminate of two adhesive film laminates, each including a predetermined number of laminated sheets, to thereby paste an adhesive layer of the surface sheet of adhesive films exposed to the one adhesive film laminate to the same position on the bottom surface of the other adhesive film laminate and polymerize and integrate the adhesive films as a new one adhesive film laminate.

The cover material is removed from the adhesive film laminate reduced in thickness by repeated peeling to polymerize and integrate the adhesive film with another adhesive film laminate. Therefore, it is possible to form again a new adhesive film laminate having thickness equal to or larger than predetermined thickness and excellent in form retention. Consequently, it is possible to change the adhesive film laminate that has lost sturdiness because of a decrease in laminated sheets and lacks form retention to a form excellent in the form retention again through simple work. Therefore, it is possible to use the adhesive films of the original adhesive film laminate to the end without affecting pasting work efficiency.

According to the configuration, it is possible to easily peel the respective adhesive films one by one off the adhesive film laminate using the pull-piece. The entire adhesive film laminate has predetermined form retention according to lamination. The pull-piece or the adhesive film laminate covered with the cover material is gripped. Therefore, the adhesive film laminate having excellent transportability and pasting work efficiency is provided.

DESCRIPTION OF EMBODIMENTS

Figure 1:
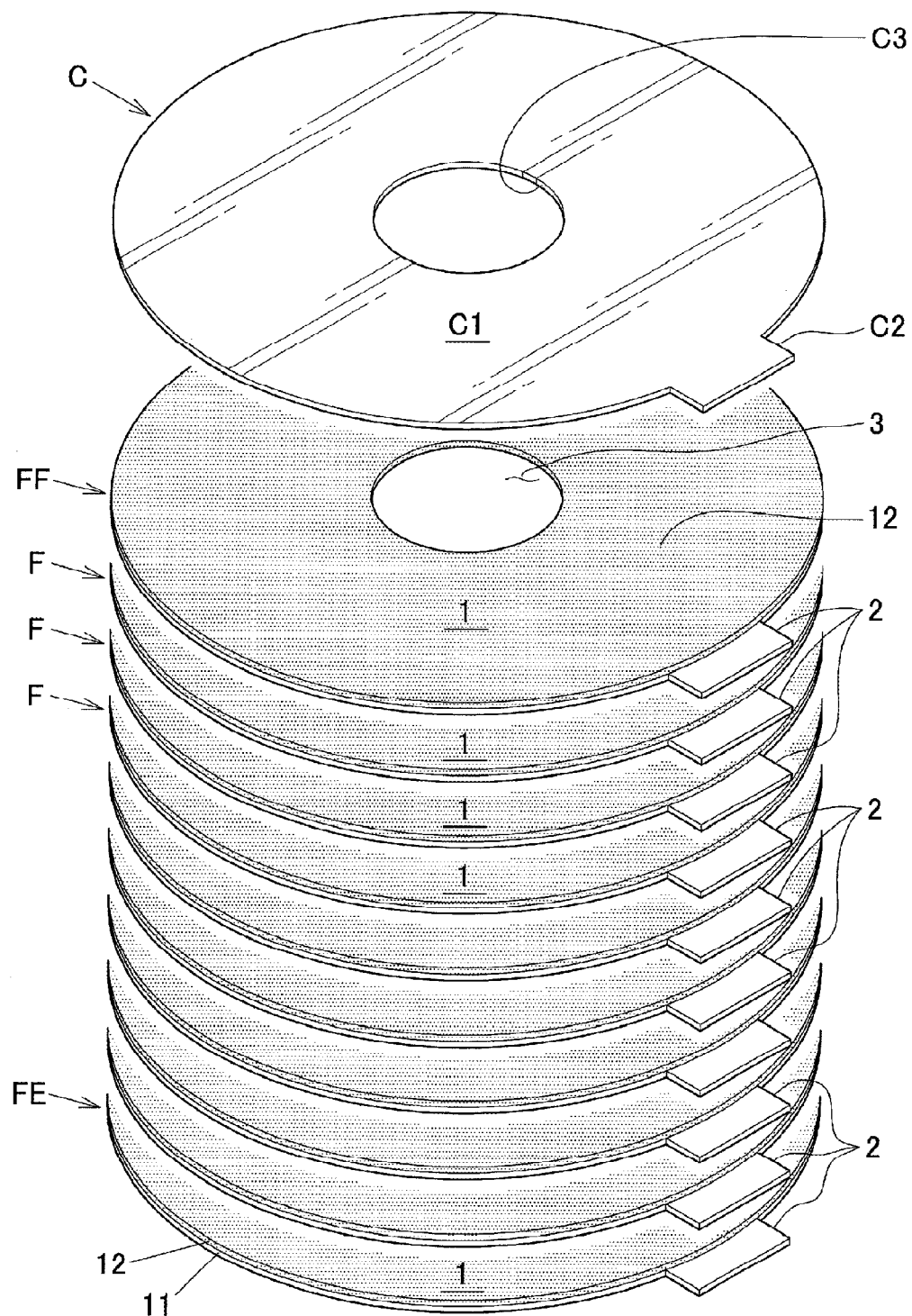
FIG. 1 is an exploded perspective view showing the configuration of an adhesive film laminate for wheel protection in a first embodiment.

The configuration of the present invention is explained in detail below on the basis of the drawings shown as embodiments. An adhesive film laminate LB for wheel protection of the present invention including forms of the respective embodiments is an adhesive film laminate for wheel protection having an adhesive layer on one surface of the adhesive film, and configured by peelably laminating a plurality of sheets of adhesive films F having a shape for covering a wheel W surface of an automobile. In the respective adhesive films F, a pull-piece 2 functioning as a pull margin in peeling the sheets one by one is formed protruding out from at least a portion of the edge of a covered section 1 laminated by a base material layer 11 and the adhesive layer 12. The covered sections 1 of the plurality of adhesive films F overlap each other in substantially the same positions and are laminated and integrated by the adhesive layers 12 on the respective one surfaces. A cover material C that covers the covered section 1 of the surface sheet of adhesive films FF is peelably pasted to the adhesive layer 12 on the one surface of the surface sheet of the adhesive films FF. Adjacent pull-pieces 2 of at least a portion of the laminated adhesive films F are laminated having an overlapping portion in all or a portion of the facing surfaces thereof.

(Basic Configuration of the Adhesive Film)

The respective adhesive films include the pull-piece 2 formed protruding out from at least a portion of the edge of a main body section and configured by a base material layer not having the adhesive layer 12 on both the surfaces.

(Basic Configuration of the Adhesive Film Laminate)

The covered sections 1 of the respective adhesive films F are laminated overlapping each other in substantially the same positions and at substantially the same angles. At this point, the respective pull-pieces 2 are laminated in a non-adhesive state each other with the facing surfaces of adjacent sheets having overlapping portions.

(Formation of the Pull-Piece)

The pull-piece 2 is formed in a shape of a laterally long flat external shape as a whole. When a protruding direction of the pull-piece 2 from the covered section 1 is represented as upward direction, a base in the upward direction (a short side in the horizontal direction) is connected to a portion of the edge of the circular covered section 1. In the figure, the pull-piece 2 and the covered section 1 are formed in an integral partial protruding shape by integral punching of the same film. However, the pull-piece 2 of another configuration may be additionally fixed to the periphery of the covered section 1 by pasting, bonding, or locking.

The pull-piece 2 shown in the figure is protruded at a small fixed protrusion amount only in a portion over in about one tenths portion of the periphery of the circular covered section 1. Besides, a plurality of the pull-pieces 2 may be formed from two or more places in the periphery of the covered section 1 in one adhesive film.

(Separating Treatment)

Separating treatment in the embodiment is performed by forming a plurality of micro convex portions 23T and a plurality of micro concave portions 23D in a predetermined pattern by embossing. The separating treatment is formed in a front side region 2H excluding a connecting section neighborhood region 2C to the covered section 1.

(Non-Adhesive Surface)

In an overlapping portion of the pull-pieces 2 of the adhesive film laminate for wheel protection, at least one facing surface is made of a non-adhesive surface not adhering or bonding to the other facing surface of the adjacent pull-piece 2.

(Separating Treatment Layer)

In one or both facing surfaces of the pull-pieces 2 adjacent to each other of the respective adhesive films F, in a portion of a region in the overlapping portion, a separating treatment layer for increasing slippage with or a separation distance from the other facing surface is formed.

The separating treatment layer means a surface layer applied with layer formation treatment or deformation treatment for increasing slippage with or an inter-facing surface distance from the other facing surface. The layer formation treatment means denaturation treatment for a surface for increasing a separating property with respect to the facing surface through, for example, formation of a releasing layer including acrylic resin. The deformation treatment means surface treatment of physical deformation for maintaining, through, for example, formation of the micro concave portion 23D or the micro convex portion 23T, an inter-facing surface distance larger than an original inter-facing surface distance when a position with respect to a facing surface is deviated. For example, the micro concave portion 23D and the micro convex portion 23T are respectively formed in positions corresponding to respective pull-piece 2 both surfaces by applying both surface embossing of a predetermined emboss pattern. When the pull-pieces 2 are shifted from each other, the micro convex portion 23T projected into the micro concave portion of the facing surface is disengaged from the micro concave portion 23D to form a separation distance from the facing surface according to the shape of the micro convex portion 23T.

(Method of Pasting an Adhesive Film to an Automobile Wheel)

As an example of a method of pasting an adhesive film to an automobile wheel, there is a method including the following step: a partial peeling step S1 of holding one end of the bottom sheet of laminated adhesive films FE and partially peeling the bottom sheet of the adhesive films FE to turn back the bottom sheet of the adhesive films FE to an end on the opposite side of the one end at the end of the covered section 1 and partially exposing an adhesive surface of the bottom sheet of the adhesive films FE; a contact step S2 of bringing the entire adhesive film laminate including the adhesive film laminate LB after the partial peeling step S1 contact with a pasting position of the wheel W and partially pasting the partially exposed adhesive surface to a facing surface portion of a pasting surface of the wheel W of the automobile; and a shifting and pasting step S3 of shifting the entire adhesive film laminate LB brought into contact with the pasting surface by the step S2 to the other end direction from the pasting position while keeping the adhesive film laminate LB in contact with the pasting surface to paste the residual adhesive layer 12 of the bottom sheet of the adhesive films FE while exposing the adhesive layer 12 to the pasting surface side starting from the partially pasted surface by the step.

When a method of pasting adhesive films to a plurality of automobile wheels is performed, the three steps are respectively repeated for pasting surfaces of the plurality of wheels. This is a method of repeatedly applying pasting work to the plurality of pasting surfaces using one laminate. Since it is unnecessary to separate adhesive films from the laminate and transport the adhesive films one by one, the pasting work is continuously smoothly performed.

Since a separate sheet or the like provided for each of the adhesive films is absent, complication in adhesive films attached with separate sheets in the past such as peeling the separate sheets one by one is absent.

The pasting method can be basically applied to an adhesive film laminate irrespective of the shape of the adhesive film laminate as long as a plurality of covered sections 1, on one surfaces of which the adhesive layers 12 are formed and which is capable of protecting a wheel, are laminated by the respective adhesive layers 12 in the adhesive film laminate. The pasting method is not always limited to the laminate of the adhesive films F including the pull-pieces 2. Note that, when the pasting method is applied in the laminate of the adhesive films F including the pull-pieces 2, the pull-pieces 2 can be used as identification guides for a start position of partial peeing and a partial peeling direction. The pull-piece 2 group or the pull-piece 2 of the adhesive film F brought into contact with the pasting surface can be gripped and carried. A contact angle can be specified according to the position of the pull-piece 2 brought into contact with the pasting surface. A shifting direction in performing shifting and pasting can be recognized according to a formation position of the pull-piece 2 brought into contact with the pasting surface or the residual pull-piece 2 group. These enable accurate and quick pasting work for the adhesive film.

(Supplying Method for the Adhesive Film)

Figure 4:
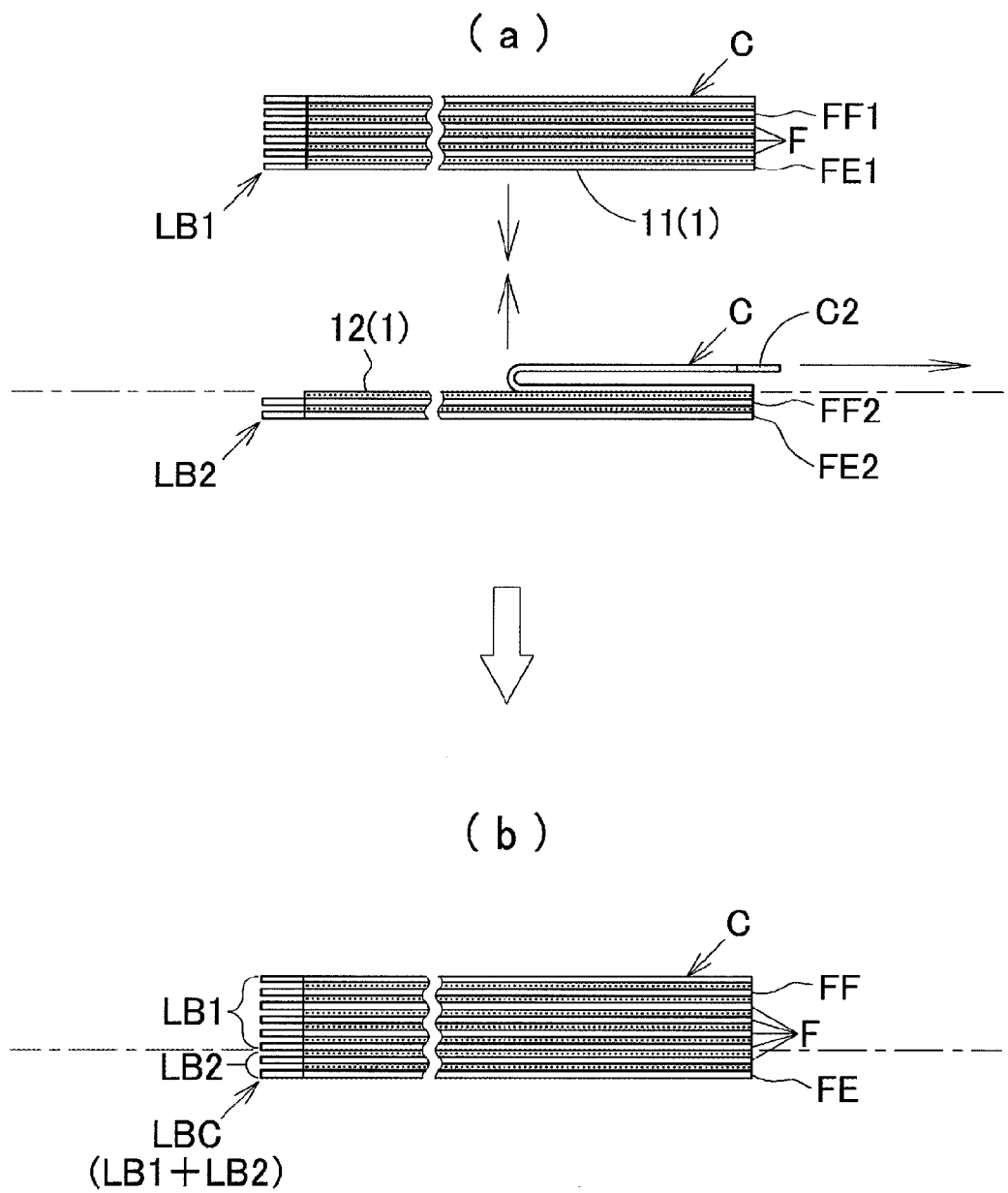
FIG. 4 is an explanatory diagram of a method of supplying the adhesive film in the adhesive film laminate in the embodiment.

As an example of a method of supplying the adhesive film of the adhesive film laminate for wheel protection, there is a method including the following steps as shown in FIG. 4, for example: a step of peeling and removing one cover material of an adhesive film laminate LB2 for wheel protection of two adhesive film laminates LB1 and LB2 for wheel protection, each including a predetermined number of laminated layers, to expose an adhesive surface of the bottom sheet of an adhesive film FF2; and pasting the exposed adhesive surface to the same position of the bottom surface of the other adhesive film laminate LB1 for wheel protection and laminating and integrating the adhesive film laminates LB1 and LB2 as one superimposed adhesive film laminate LBC for wheel protection.

The adhesive film laminate reduced in thickness by repeated peeling is polymerized and integrated with another adhesive film laminate, whereby a new adhesive film laminate excellent in form retention having thickness equal to or larger than predetermined thickness can be formed again. Consequently, it is possible to change the adhesive film laminate that lacks form retention because of a reduction in thickness to a form excellent in the form retention again through. Therefore, it is possible to use all the adhesive films of the original adhesive film laminate to the end without affecting pasting work efficiency.

First Embodiment

A protective adhesive film laminate in a first embodiment shown in FIGS. 1 to 4 includes, in the base material layer 11 of the adhesive film F, center holes 3 and C3 having a concentric shape same as the external shape formed by a perfect circle. The pull-piece 2 is formed in a laterally long rectangular shape. Only a separating treatment layer made of a releasing layer is formed on one surface of a base material layer of the pull-piece 2. Embossing is not applied to the pull-piece 2 unlike embodiments explained below. Since the center holes are formed, it is possible to inspect a mechanism mounted on an inside of the pasting surface after pasting to a wheel. For example, a tightening state of a bolt mounted to project inside the wheel can be checked even after pasting of the protective adhesive film F.

Figure 2:
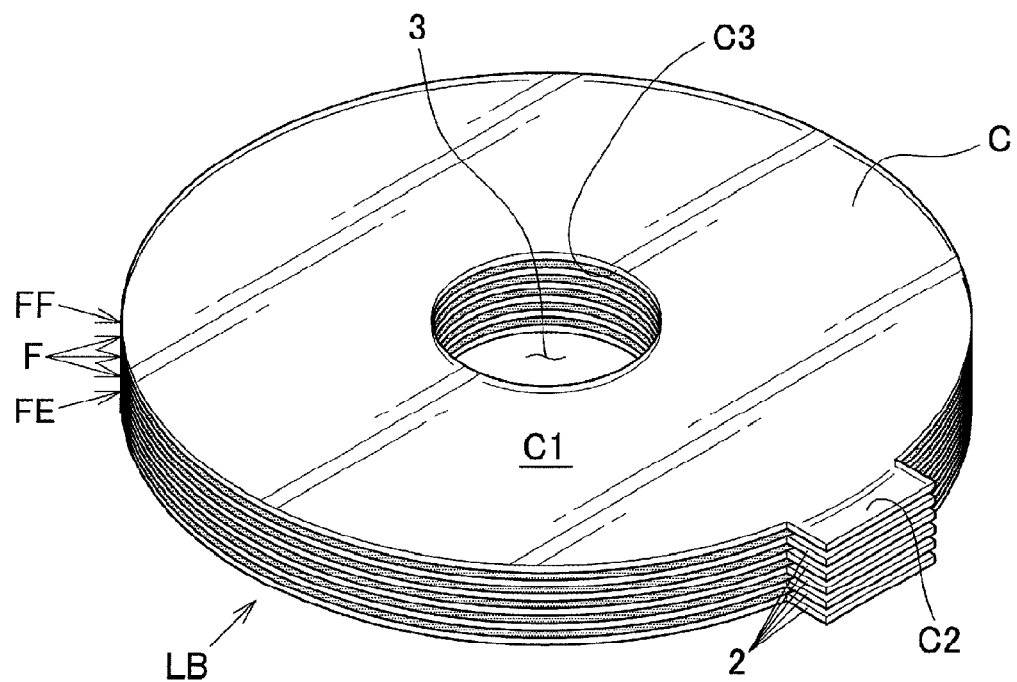
FIG. 2 is an external perspective view of the adhesive film laminate in the first embodiment.
Figure 3:
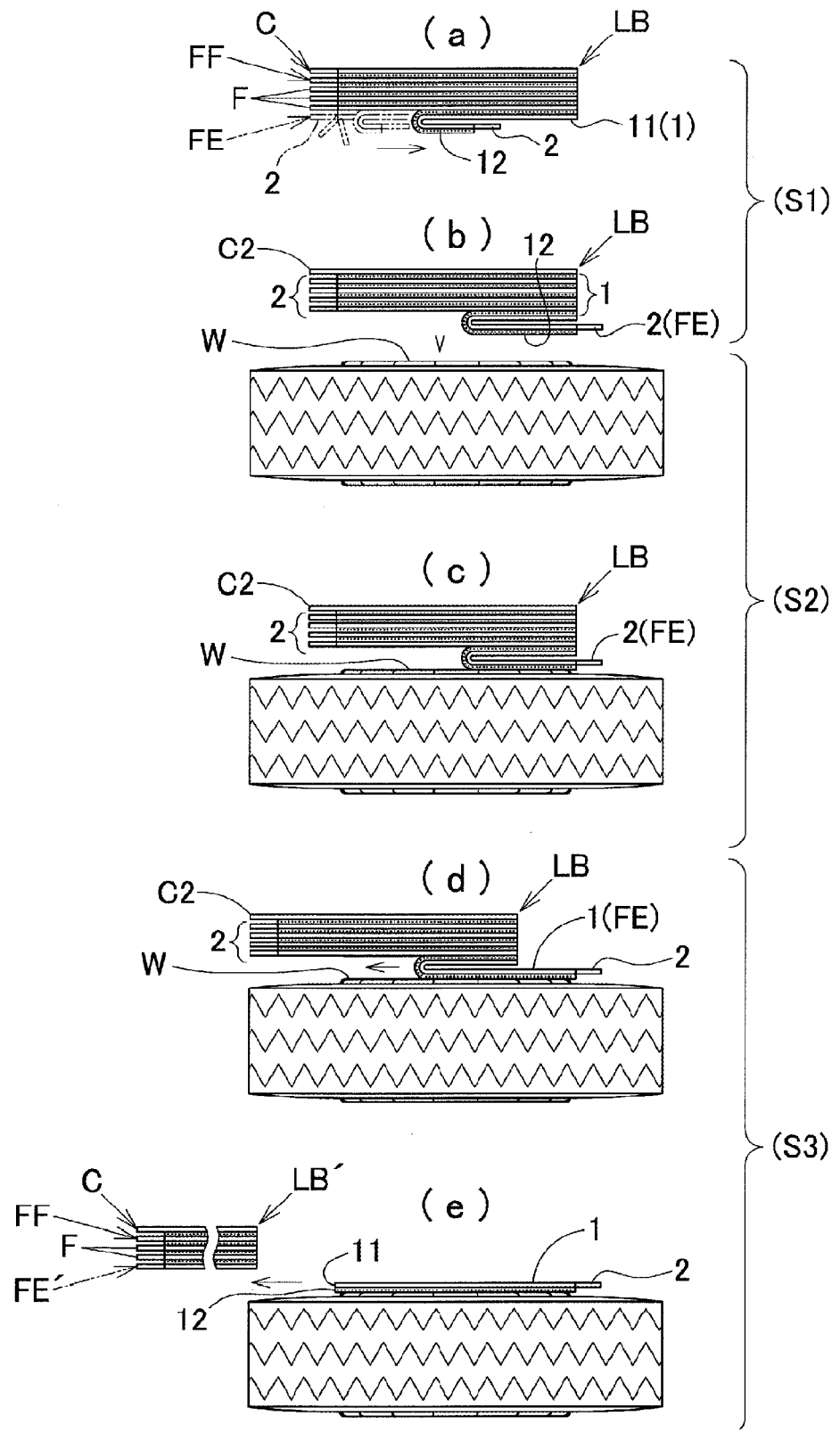
FIG. 3 is an explanatory diagram of a method of pasting an adhesive film to a wheel by the adhesive film laminate in the embodiment.

In the adhesive film laminate in the first embodiment, the pull-pieces 2 of the respective adhesive films F are formed in a four-sided shape including a connection side connected to the base material layer 11, left and right sides adjacent to the connection side, and a distal end side 2E opposite to the connection side. Among the sides, both the left and right sides are orthogonal to both of the connection side and the distal end side 2E. The pull-pieces 2 adjacent to each other overlap in a completely coinciding position such that the entire piece shape thereof is an overlap section. The pull-piece 2 is configured from only the base material layer 11 and a base material layer continuous to the base material layer 11 and same as the base material layer 11. The pull-piece 2 does not include the adhesive layer 12 on both surfaces. On the other hand, in the covered section 1, as shown in FIGS. 1 and 2, the adhesive layer 12 is formed on one surface (in the figure, the upper surface) of the base material layer 11. The total thickness of the covered section 1 is larger than the total thickness of the base material layer 11 by the thickness of the adhesive layer 12.

The pull-piece 2 explained above is formed not largely projecting from the adhesive film F and is formed in a flat shape extending along a finger width and finger length of a pasting operator, giving it excellent finger-gripability.

(Physical Properties of a Creation Example in the First Embodiment)

The adhesive film of the present invention is used for the purpose of surface protection for an aluminum wheel or a steel wheel for an automobile and rust prevention for a disk brake. Tackiness and adhesion are improved, whereby peeling prevention after pasting, a film with high weather resistance, and heat resistance and humidity resistance by an adhesive are improved and a glue residue after outdoor exposure is reduced.

Specifically, it is necessary to satisfy all physical properties: as initial adhesion, adhesion equal to or higher than 4.50 N and equal to or lower than 10.00 N per 25 mm 30 seconds after pasting, as heat resistance, adhesion equal to or higher than 7.00 N and equal to or lower than 10.0 N per 25 mm after elapse of 672 hours at 70° C., and, as humidity resistance, adhesion equal to or higher than 7.00 N and equal to or lower than 10.00 N per 25 mm after exposure for 240 hours at 50° C. and humidity of 95%. Note that all the physical properties are peeling test values conforming to JIS Z0237 obtained using an adherend of surface layer acrylic melamine resin.

In an example of trial manufacturing of an adhesive film configured by 1215 μm of an adhesive layer, 65 μm of a base material layer, and 0.6 μm of a releasing layer, as shown in Table 1, as initial adhesion, adhesion per 25 mm 30 seconds after pasting was 4.80 N, as heat resistance, adhesion per 25 mm after elapse of 672 hours at 70° C. was 7.50 N, and as humidity resistance, adhesion per 25 mm after exposure for 240 hours at 50° C. and humidity of 95% was 7.50 N, which satisfy all the physical properties.

TABLE 1

| | Item | | Test condition | Result Sumiron WGF | Standard (Specifications) | Adherend | Measurement standard |
|---|---|---|---|---|---|---|---|
| Adhesion strength | 1 | Initial adhesion | Normal temperature (30 sec.) | 4.80N | 2-10N/25 mm | Adherend of surface layer acrylic melamine resin (aluminum wheel) | JIS Z 0237 |
| | | | Normal temperature (20 min.) | 5.2N | | | |
| | 2 | After water immersion | Water temperature 40° C. × 240 h | 5.0N | | | |
| | 3 | Constant temperature adherence | 5° C. × 60 minutes | 7.80N | | | |
| | 4 | Heat resistance | 70° C. × 672 h | 7.70N | 4-10N/25 mm | | |
| | 5 | Humidity resistance | 50° C. × 95% × 240 h | 7.50N | | | |
| | 6 | Accelerated weathering resistance | SWOM 300 h | 7.50N | | | |
| | 7 | Natural exposure | Six months | 7.30N | | | |

(Adhesive Film Laminate LB)

The number of laminated adhesive films of the laminated adhesive film laminates LB is several tens (twenty to fifty) and is set to weight that one operator can carry. For example, twenty adhesive films are arranged in the same position, at the same angle, and in the same direction and laminated in the height direction with the respective adhesive layers 12 set as upper surfaces and one cover material C is pasted on the surface sheet of the adhesive films to configure an adhesive film laminate having total thickness of about 2.0 mm.

(Base Material Layer 11)

The base material layer 11 is made of a polyolefin film that is relatively inexpensive and has weather resistance. Specifically, for example, the base material layer 11, in which a mixed agent of ethylene-propylene copolymer and polypropylene are used, is formed at thickness of 60 μm to 65 μm. The film has "sturdiness" and pasting work is facilitated when a polypropylene (hereinafter, PP) content is increased. On the other hand, if PP is too much, the film "tends to be torn". Therefore, a polyethylene component is included to make the film "less easily torn" and pasting and turning workability is taken into account. Further, a UV absorbent is contained to suppress an ultraviolet ray and prevent deterioration of an adhesive during long-term outdoor storage of a vehicle.

(Adhesive Layer 12)

The adhesive layer 12 is made of an acrylic adhesive excellent in tackiness and having high retention in initial adhesion (immediately after pasting, specifically, after 30 seconds). In the embodiment, 15 μm of a solvent type acrylic adhesive is formed on one side (in FIGS. 1 and 2, the upper surface side) of the base material layer. Besides, a synthetic rubber adhesive may be used as long as the synthetic rubber adhesive is a solvent-based pressure-sensitive adhesive. For example, it is preferable that, for example, adhesion by a JIS Z 0237 test at a point of elapse of 30 seconds after pasting is equal to or higher than 4.50 N at the normal temperature. The acrylic adhesive satisfying such standards is excellent in, in particular, initial adhesiveness to an aluminum wheel and adhesiveness maintainability after pasting. For example, even when an automobile is suddenly started after pasting the adhesive film, the adhesive film is extremely hard to peel off.

(Releasing Layer 13)

A releasing layer 13 in the embodiment is made of a non-silicon resin layer having thickness of about 1 μm. A releasing agent is coated to facilitate peeling of laminated adhesive films. If a releasing agent containing an acrylic alkyl pendant is used, the releasing layer 13 is inexpensive but is excellent in stability when formed in a thin film shape and has a satisfactory releasing effect.

(Cover Material C)

The cover material C in the embodiment is made of a separator film that is entirely applied with blue coloring and in which a releasing cover layer equal to or thinner than 1 μm is formed on one surface of a base material cover layer having thickness of 54 μm.

Second Embodiment

Figure 5:
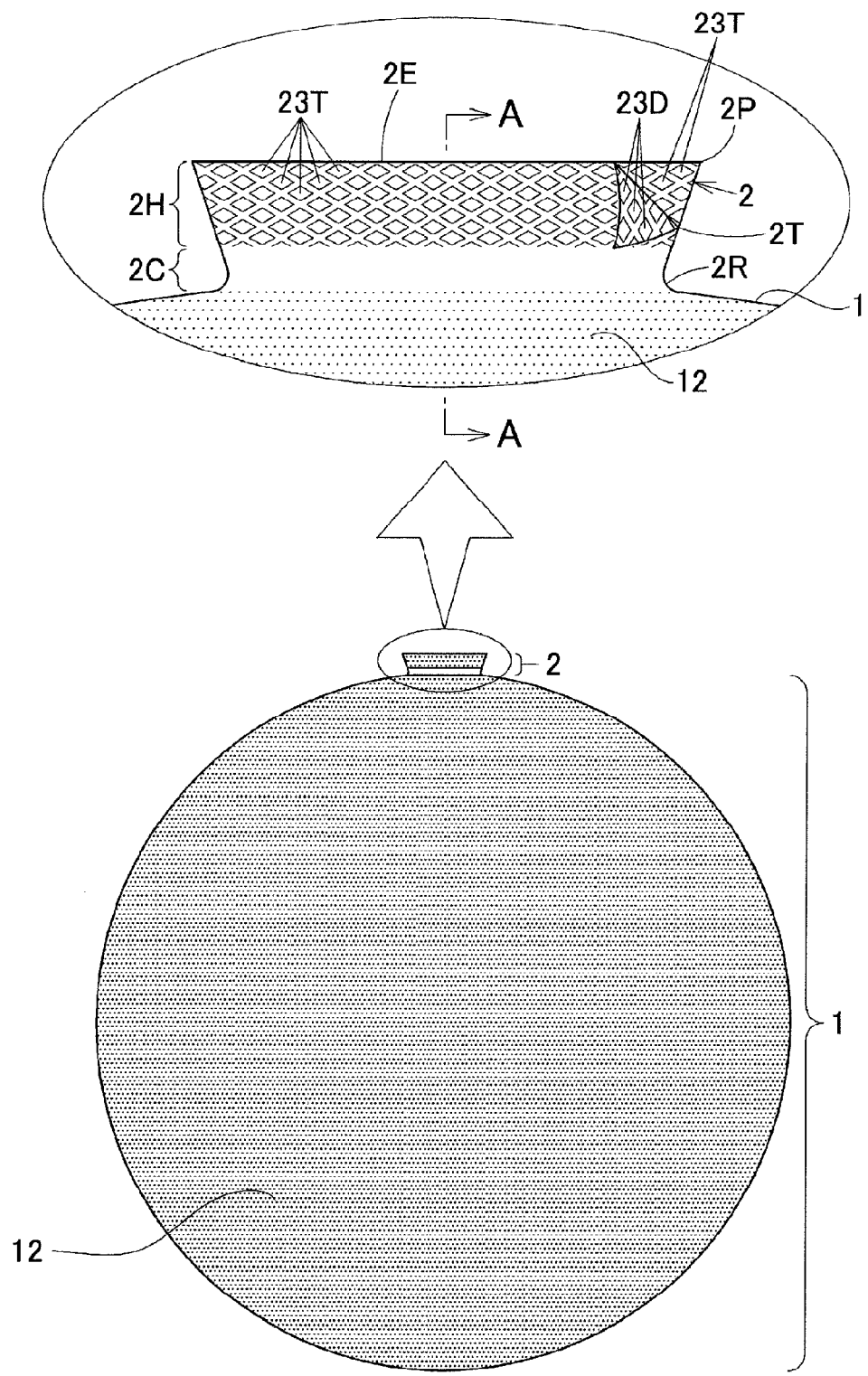
FIG. 5 is a front view of a state in which a cover material is removed in an adhesive film laminate in a second embodiment and a partially enlarged view of the state.
Figure 6:
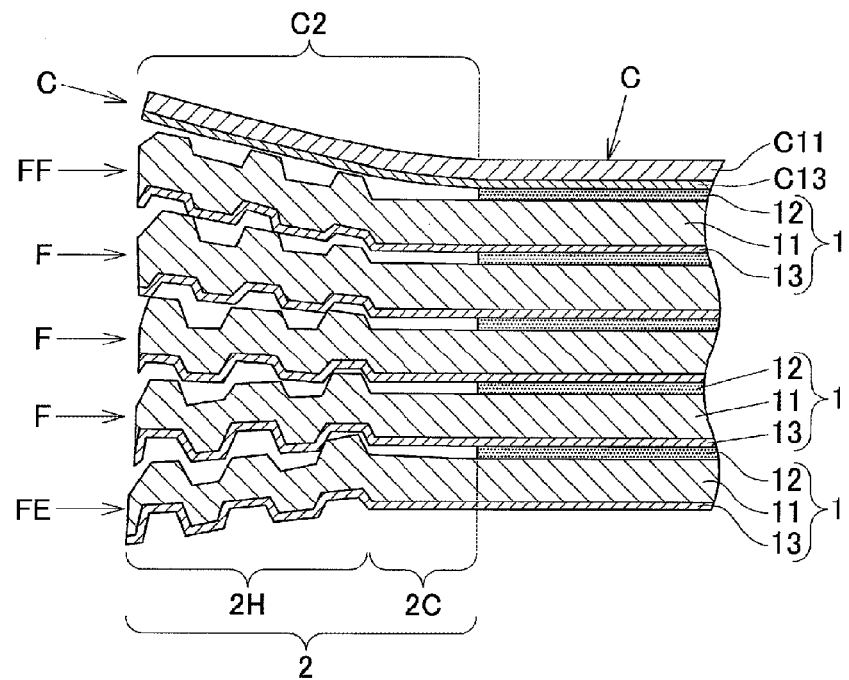
FIG. 6 is a side sectional view of the adhesive film laminate in the second embodiment in a line A-A position in FIG. 5.
Figure 10:
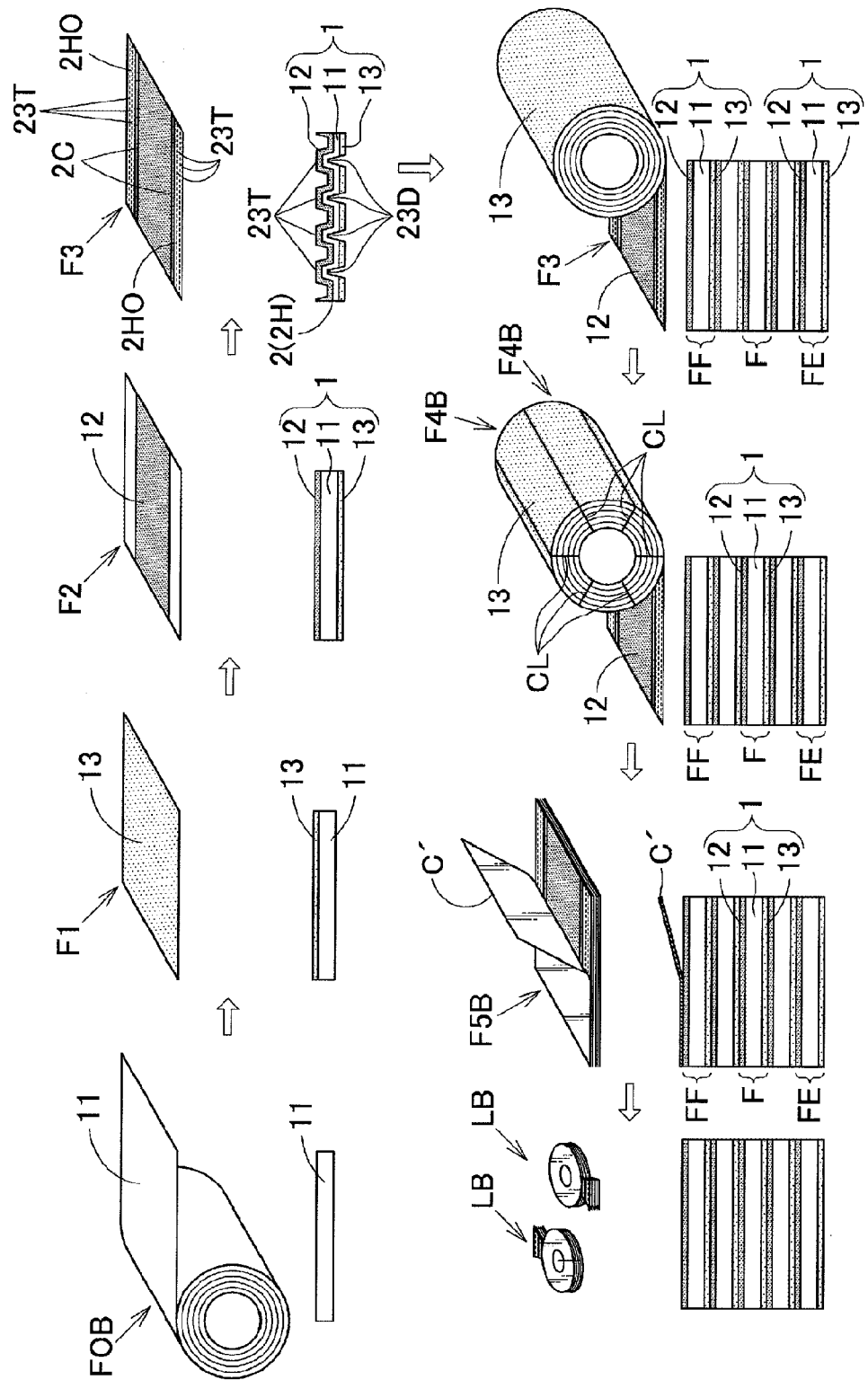
FIG. 10 is an explanatory diagram showing a manufacturing process for the respective adhesive film laminates in the second to fifth embodiments.

A protective adhesive film laminate in a second embodiment shown in FIGS. 5, 6, and 10 is different from the first embodiment in forms of a film and an adhesive film laminate in that the adhesive film laminate does not include the center holes 3 and C3 and a releasing layer including the micro concave portions 23D and convex portions 23T is further formed on the pull-piece 2. Otherwise, a basic form and a pasting method are the same as those in the first embodiment.

(Micro Convex Portions 23T)

In the separating treatment layers 23 of the respective adhesive films F in the second embodiment, in the overlapping portion of the pull-pieces 2, a plurality of micro convex portions 23T projecting to the facing surface side are formed in the front side region 2H excluding the connecting section neighborhood region 2C to the covered section 1.

The micro convex portions 23T are formed in a portion of a region on the front side excluding the connecting section neighborhood region 2C rather than over the entire surface. Therefore, further on the front side of each of the superimposed pull-pieces, a separation distance from the facing piece increases and distal end edges (distal end sides 2E) of the pull-pieces are dispersed. Consequently, it is easy to grip the pull-pieces one by one.

The micro convex portions 23T are formed on the front surface of the pull-piece and the micro concave portions 23D are formed on the rear surface of the pull-piece corresponding to formation positions of the micro convex portions 23T. In the embodiment, as shown in FIGS. 5 and 6, in the same front side regions 2H on the front surface and the rear surface of the pull-piece 2, the micro convex portions 23T group having a diamond shape and the micro concave portions 23D having the same diamond shape corresponding to each other are respectively arranged and formed in an oblique crossing direction in the same pattern. When the micro convex portions 23T and the micro concave portions 23D are as explained above, as shown in FIG. 6, a separation distance from the facing surface is formed larger as shown in FIG. 6, each of the pull-pieces is in contact with the pull-piece adjacent thereto and is more largely bent and deformed from the connecting section toward the front side.

(Separating Treatment Layer 23)

In the second embodiment, as the separating treatment layer 23, in the overlapping portion of the pull-pieces 2, the plurality of micro convex portions 23T projecting to the facing surface side are formed on the surface in the front side region 2H excluding the connecting section neighborhood region 2C to the covered section 1 and the plurality of micro concave portions 23D hollowing to the facing surface side are formed on the rear surface in the front side region 2H.

In the second embodiment, the plurality of micro convex portions 23T are separately formed from the connecting section side toward the distal end side 2E side. Therefore, as shown in FIG. 6, further on the front side of each of the superimposed pull-pieces, a separation distance from the opposed pull-piece increases. In the entire overlapping pull-piece group, the distal end edges (the distal end sides 2E) are dispersed in a substantially fan shape in sectional view (FIG. 6).

(Formation Region of the Micro Concave Portions and Convex Portions)

Formation treatment for the micro concave portions and convex portions by embossing, which is one of the separating treatment, is applied in the front side region 2H excluding the connecting section neighborhood region 2C to the covered section 1 in the overlapping portion of the pull-pieces 2. Consequently, it is possible to secure connection strength to the covered section 1 of the pull-piece 2. For example, when the micro concave portions and convex portions by embossing in the second to fifth embodiments are formed, braking strength in the formation region of the micro concave portions and convex portions is low compared with a region where the micro concave portions and convex portions are not formed. When the respective adhesive films F are peeled off the adhesive film laminate LB, it is conceivable that the connecting section of the pull-piece 2 is torn and only the pull-piece 2 is separated from the covered section 1. To prevent this, the embossing, which is the separating treatment layer 23, is not applied to a neighborhood region of the connecting section.

(Manufacturing Method Example of the Adhesive Film Laminate LB)

The adhesive film laminate LB is continuously manufactured by, for example, a manufacturing process shown in FIG. 10. Specifically, the manufacturing process includes a releasing layer forming step of drawing out the base material layer 11 from a roll-like film raw material FOB made of only the base material layer 11 and forming the releasing layer 13 on one surface, an adhesive layer 12 forming step of applying an adhesive to a portion of a region excluding a belt-like portion equivalent to the pull-piece on the opposite surface of the one surface, an embossing step of applying embossing to a portion of width of the non-adhesive belt-like portion, a laminating step of laminating a predetermined number of sheets undergone these respective steps as a roll body, and a cut step of cutting the roll body obtained by laminating the sheet to obtain a laminated cut body; and a sheet pasting step of pasting a surface protection sheet to the laminated cut body by the cut step.

Figure 11A:
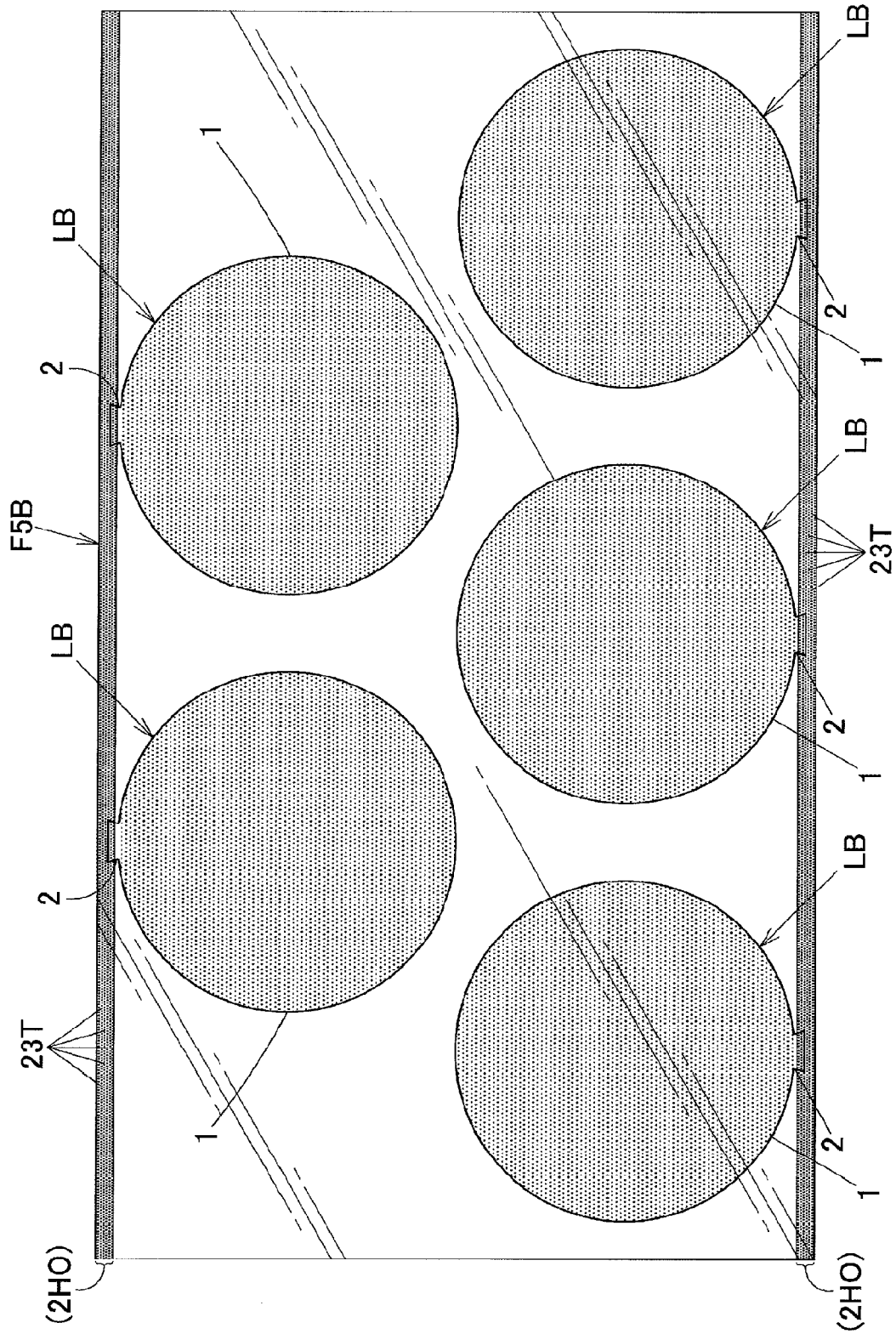
FIG. 11a is a plan view explanatory diagram showing allocation of adhesive film laminates in a laminated cut body in FIG. 10.
Figure 11B:
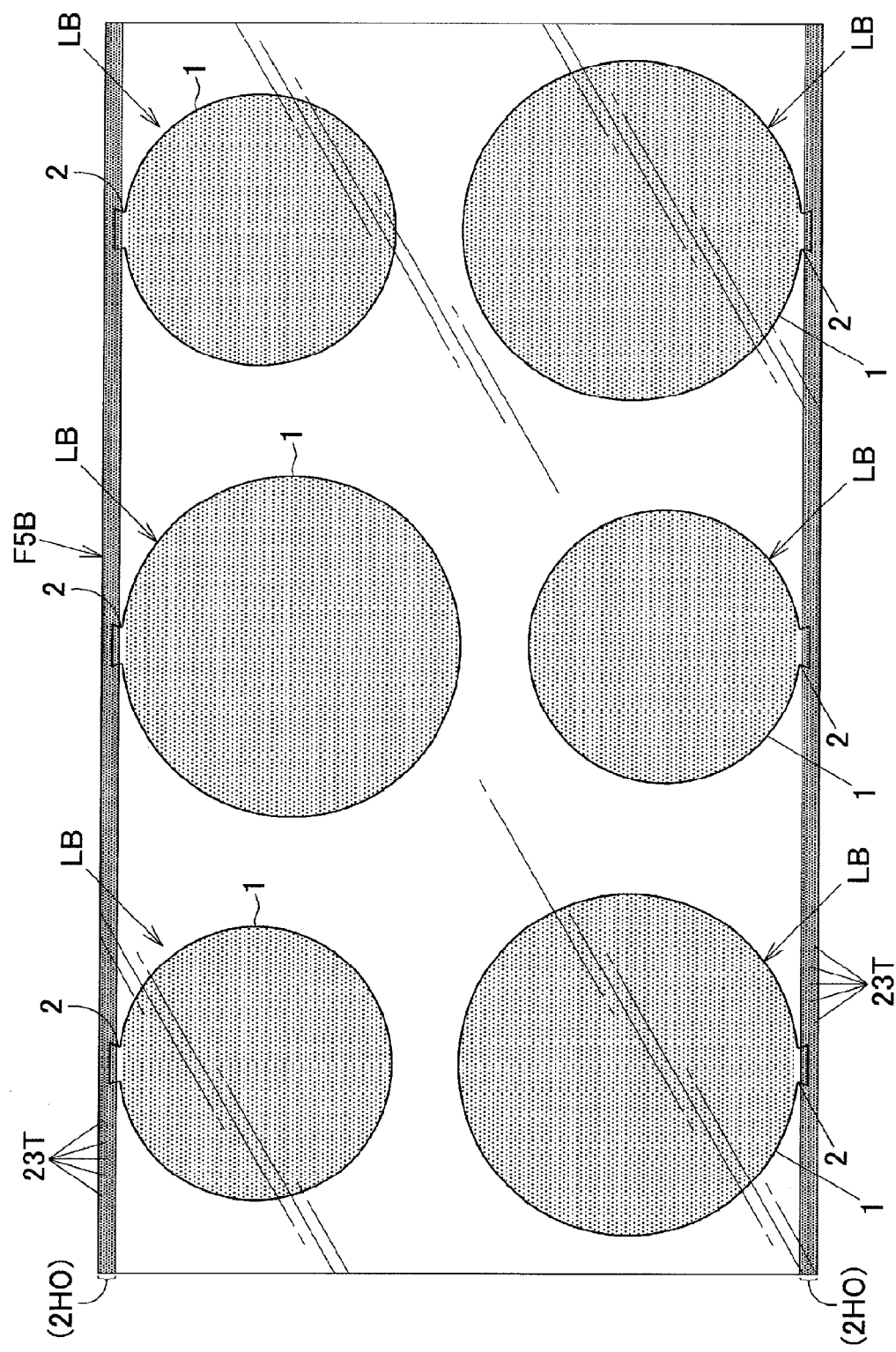
FIG. 11b is a plan view explanatory diagram showing allocation of the adhesive film laminates in the laminated cut body in FIG. 10.
Figure 11C:
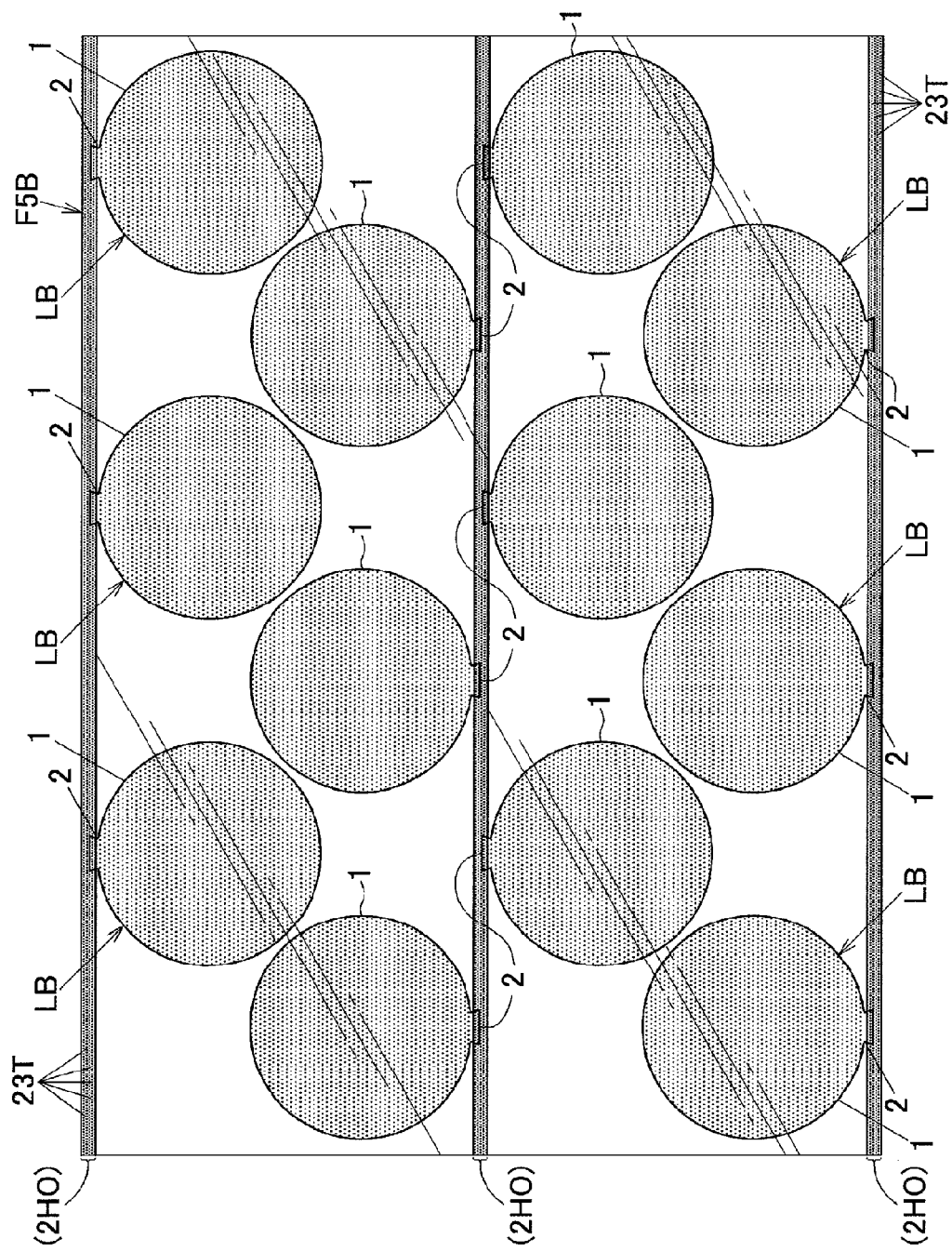
FIG. 11c is a plan view explanatory diagram showing allocation of the adhesive film laminates in the laminated cut body in FIG. 10.

FIGS. 11a, 11b, and 11c are diagrams showing formation examples of a belt-like region, which is a portion where the pull-piece 2 is formed, and allocation examples of punching in the laminated cut body F5B. FIG. 11a is an allocation diagram of five adhesive film laminates having the same size to be punched, FIG. 11B is an allocation diagram of three each of two kinds of large-size and small-size adhesive film laminates, i.e., six adhesive film laminates in total to be punched, and FIG. 11c is an allocation diagram of six each of left and right adhesive film laminates of the same size, i.e., twelve adhesive film laminates in total to be punched. In FIGS. 11a and 11b, embossing of the belt-like region to be the separating treatment layer is provided on the left and right of the film. A thick belt region including the belt-like region on one side and having width larger than the width of the belt-like region is set as a non-adhesive region where the adhesive layer 12 is not formed. In FIG. 11c, embossing of the belt-like region to be the separating treatment layer is provided on the left and right and the center of the film. A thick belt region including the belt-like region in the center and having width larger than the width of the belt-like region is set as a non-adhesive region where the adhesive layer 12 is not formed.

(Pull-Piece 2 in the Second Embodiment)

The pull-piece 2 in the second embodiment shown in FIG. 5 is made of a trapezoidal piece having a distal end side (the upper side) longer than a connection side (the base) and having both side inclined sides 2T narrowing downward in front view. Lower both corner sections, which are connecting sections, of the pull-piece 2 is formed as a concave curved surface in a substantially semi-arcuate shape. As the separating treatment, on the surface in the front side region 2H, the micro convex portions 23T having the diamond shape are arranged lengthwise and crosswise at equal intervals in oblique crossing directions. On the rear surface in the front side region 2H, the micro concave portions 23D having the same diamond shape as the micro convex portions 23T are arranged lengthwise and crosswise at equal intervals in oblique crossing directions in positions corresponding to the micro convex portions 23T. The adjacent pull-pieces 2 overlap in completely coinciding positions such that the entire piece shape thereof is an overlapping portion.

Third Embodiment (Pull-Piece 2 in a Third Embodiment)

Figure 7:
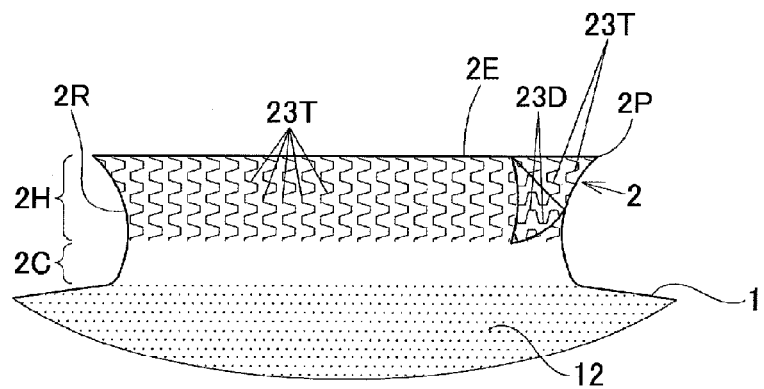
FIG. 7 is a front view partial enlarged view of a state in which a cover material is removed in an adhesive film laminate in a third embodiment.

The pull-piece 2 in a third embodiment shown in FIG. 7 is made of a laterally long flat shape piece, both sides of which are formed as concave surfaces in a substantially semi-arcuate shape. As the separating treatment, on the surface in the front side region 2H, the micro convex portions 23T having a meandering thin line shape formed in zigzag in the longitudinal direction with both direction oblique directions and longitudinal direction lines continued from the distal end side 2E to the connecting section side are arranged in parallel in the width direction. On the rear surface in the front side region 2H, the plurality of micro concave portions 23D having a meandering thin line shape formed in zigzag in the longitudinal direction are provided in the same manner as the micro convex portions 23T. Otherwise, components and a pasting method, a supplying method, and a manufacturing method not specifically explained herein are the same as those in the second embodiment.

Fourth Embodiment (Pull-Piece 2 in a Fourth Embodiment)

Figure 8:
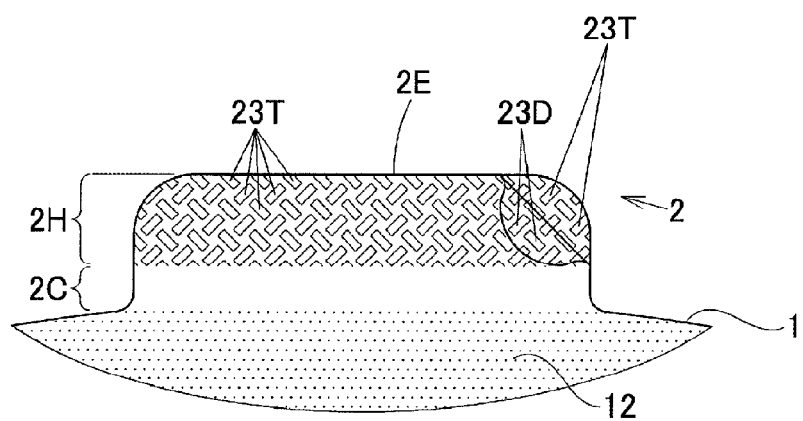
FIG. 8 is a front view partial enlarged view of a state in which a cover material is removed in an adhesive film laminate in a fourth embodiment.

The pull-piece 2 in a fourth embodiment shown in FIG. 8 is made of a laterally long rectangular piece, both corners of the distal end side 2E of which are bent and formed in a quarter arcuate shape. As the separating treatment, on the surface in the front side region 2H, the plurality of micro convex portions 23T having a flat rectangular shape facing obliquely downward and obliquely upward are arrayed obliquely crossing each other. On the rear surface in the front side region 2H, the plurality of micro concave portions 23D having a flat rectangular facing obliquely downward and obliquely upward are provided in the same manner as the micro convex portions 23T. Otherwise, components and a pasting method, a supplying method, and a manufacturing method not specifically explained herein are the same as those in the second embodiment.

Fifth Embodiment (Pull-Piece 2 in a Fifth Embodiment)

Figure 9:
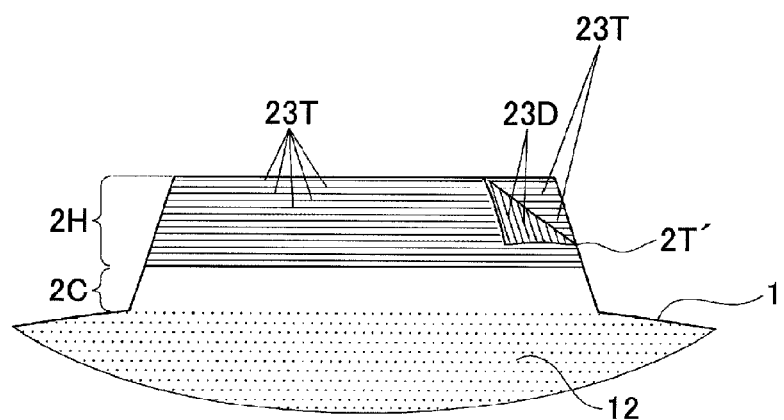
FIG. 9 is a front view partial enlarged view of a state in which a cover material is removed in an adhesive film laminate in a fifth embodiment.

The pull-piece 2 in a fifth embodiment shown in FIG. 9 is made of a trapezoidal piece having the distal end side 2E (the upper side) shorter than the connection side (the base) and having the both side inclined sides 2T narrowing upward. As the separating treatment, on the surface in the front side region 2H, the micro convex portions 23T made of micro convex lines are formed by embossing of a large number of thin line shapes extending in parallel to the connection side and the distal end side. On the rear surface in the front side region 2H, the linear micro concave portions 23D are formed to match the micro convex portions 23T. Otherwise, components and a pasting method, a supplying method, and a manufacturing method not specifically explained herein are the same as those in the second embodiment.

(Action and Effects)

A protective film for wheel disk brake rust prevention in the past is configured in a pine-needle shape by adhesive films and paper separators. During pasting, the paper separator including each of the films is peeled and pasted. Therefore, paper separator wastes are a critical problem in a work site (an automobile body manufacturer production line, etc.). On the other hand, although the adhesive film laminate of the present invention includes only one surface sheet of the cover material C, the adhesive films are directly pasted and laminated without using a separator or the like. Therefore, the paper separator in the past is unnecessary and wastes in a work site are reduced.

According to the configurations of the embodiments, the laterally long flat pull-pieces 2 formed projecting to be a start portion of a peeling position are shifted with respect to the residual pull-piece group while being kept placed along a finger of an operator one by one. Consequently, it is possible to easily peel the respective adhesive films F one by one from the adhesive film laminate LB. Since the pull-pieces 2 are laminated having an overlapping portion, the pull-pieces 2 play a function of a grip during transportation or during pasting work. Since the large number of adhesive films F and the large number of cover materials C are laminated, the entire adhesive film laminate LB has sturdiness and is excellent in form retention. Since the cover material C covers the adhesive layer 12 of the surface sheet of the adhesive film FF, the adhesive film FF is prevented from unnecessarily adhering to surfaces other than a pasting surface during use. Transportability and pasting work efficiency of the adhesive film laminate are greatly improved by the pull-piece, the laminated configuration, and the cover material.

The entire facing surface of the overlapping portion of the pull-pieces 2 is formed of the non-adhesive surface not including the adhesive layer 12 on both the front and rear surfaces. Therefore, the pull-pieces 2 have a satisfactory dispersion property without adhering or bonding. Consequently, it is possible to hold the pull-pieces 2 one by one and easily peel the respective adhesive films from the adhesive film laminate.

The separating treatment layer made of the releasing layer is formed on the facing surface of the overlapping portion of the pull-pieces. Therefore, the pull-pieces secure slippage or a separation distance each other. Compared with a structure in which pull-pieces simply do not adhere or bond, the pull-pieces have a more satisfactory dispersion property. Consequently, it is possible to hold the pull-pieces one by one and extremely easily peel the respective adhesive films off the adhesive film laminate.

According to the configurations in the second to fifth embodiments, in addition to the separating treatment layer on the facing surface one side of the overlapping portion of the pull-pieces, the micro convex portion on one side of the facing surfaces and the micro concave portion on the other surface are formed. Therefore, the pull-pieces secure slippage or a separation distance each other. Compared with a structure in which pull-pieces simply do not adhere or bond, the pull-pieces have a more satisfactory dispersion property. Consequently, it is possible to hold the pull-pieces one by one and extremely easily peel the respective adhesive films off the adhesive film laminate.

Besides, the present invention may be, for example, a form in which the surface protection cover material C having a large area is not used. Further, the specific components and the using methods of the respective sections are not limited to the embodiments explained above. Various modifications and combinations are possible without departing from the spirit of the present invention.

The invention claimed is:

1. A pasting method of pasting adhesive films one by one to a pasting surface of a wheel of an automobile using an adhesive film laminate for wheel protection having an adhesive layer on one surface and configured by peelably laminating a plurality of sheets of adhesive films having a shape for covering a wheel surface of an automobile, wherein, in respective adhesive films, a pull-piece functioning as a pull margin held in peeling the sheets one by one is formed protruding out from at least a portion of an edge of a covered section laminated by a base material layer and an adhesive layer, covered sections of the plurality of sheets of adhesive films overlap each other and are laminated and integrated by adhesive layers on respective one surfaces, a cover material that covers the covered section of a surface sheet of the adhesive films is peelably pasted to the adhesive layer on the one surface of the surface sheet of the adhesive films, and adjacent pull-pieces of at least a portion of the laminated adhesive films are laminated having an overlapping portion in all or a portion of facing surfaces thereof, the pasting method comprising:

a partial peeling step of holding a pull-piece of a bottom sheet of laminated adhesive films, partially peeling the bottom sheet of laminated adhesive films to turn back the bottom sheet of laminated adhesive films to an end on an opposite side of a pull-piece forming section at an end of a covered section, and partially exposing an adhesive layer of the bottom sheet of the adhesive films;

a contact step of pasting the partially exposed adhesive layer of the adhesive film laminate after the partial peeling step to a pasting surface of the wheel of the automobile; and a shifting and pasting step of shifting the entire adhesive film laminate brought into contact with the pasting surface by the contact step to an end direction on the opposite side from the pasting position while keeping the adhesive film laminate in contact with the pasting surface to paste a residual adhesive layer of the bottom sheet of the adhesive films while exposing the adhesive layer to the pasting surface side starting from a pasting portion.

2. The pasting method according to claim 1, wherein, in overlapping portions of the pull-pieces of the respective adhesive films, at least one facing surface is formed of a non-adhesive surface not adhering or bonding to the other facing surface of the adjacent pull-pieces.

3. The pasting method according to claim 2, wherein, in a portion of a region in the overlapping portion in the facing surfaces of one or both of the adjacent pull-pieces of the respective adhesive films, a separating treatment layer for increasing slippage with or a separation distance from the other facing surface is formed.

4. The pasting method according to claim 2 or 3, wherein, in separating treatment layers of the respective adhesive films, a plurality of micro convex portions projecting to the facing surface side are formed in a front side region excluding a connecting section neighborhood region to the covered section in the overlapping portion of the pull-pieces.

5. The pasting method according to claim 4, wherein the pull-pieces of the respective adhesive films are formed in a piece shape including four sides made up of a connection side connected to the covered section, left and right sides adjacent to the connection side, and a distal end side, which is an opposed side of the connection side, and, among the sides, both the left and right sides are shorter than both of the connection side and the distal end side and piece width formed by a distance between the left and right sides gradually increases from a side of the connection side to a side of the distal end side.

6. The pasting method according to any one of claim 1 or 2 or 3, wherein pull-pieces of the respective adhesive films are formed in a piece shape including four sides made up of a connection side connected to the covered section, left and right sides adjacent to the connection side, and a distal end side, which is an opposed side of the connection side, and, among the sides, both the left and right sides are shorter than both of the connection side and the distal end side and piece width formed by a distance between the left and right sides gradually increases from a side of the connection side to a side of the distal end side.

7. A supplying method of supplying an adhesive film of an adhesive film laminate for wheel protection having an adhesive layer on one surface and configured by peelably laminating a plurality of sheets of adhesive films having a shape for covering a wheel surface of an automobile, wherein, in respective adhesive films, a pull-piece functioning as a pull margin held in peeling the sheets one by one is formed protruding out from at least a portion of an edge of a covered section laminated by a base material layer and an adhesive layer, covered sections of the plurality of sheets of adhesive films overlap each other and are laminated and integrated by adhesive layers on respective one surfaces, a cover material that covers the covered section of a surface sheet of the adhesive films is peelably pasted to the adhesive layer on the one surface of the surface sheet of the adhesive films, and adjacent pull-pieces of at least a portion of the laminated adhesive films are laminated having an overlapping portion in all or a portion of facing surfaces thereof, the supplying method comprising peeling and removing a cover material of one adhesive film laminate of two adhesive film laminates, each including a predetermined number of laminated sheets, to thereby paste an adhesive layer of a surface sheet of adhesive films exposed to the one adhesive film laminate to a same position on a bottom surface of the other adhesive film laminate and polymerize and integrate the adhesive films as a new one adhesive film laminate.

8. The supplying method according to claim 7, wherein in overlapping portions of the pull-pieces of the respective adhesive films, at least one facing surface is formed of a non-adhesive surface not adhering or bonding to the other facing surface of the adjacent pull-pieces.

9. The supplying method according to claim 8, wherein in a portion of a region in the overlapping portion in the facing surfaces of one or both of the adjacent pull-pieces of the respective adhesive films, a separating treatment layer for increasing slippage with or a separation distance from the other facing surface is formed.

10. The supplying method according to claim 8 or 9, wherein in separating treatment layers of the respective adhesive films, a plurality of micro convex portions projecting to the facing surface side are formed in a front side region excluding a connecting section neighborhood region to the covered section in the overlapping portion of the pull-pieces.

11. The supplying method according to claim 10, wherein the pull-pieces of the respective adhesive films are formed in a piece shape including four sides made up of a connection side connected to the covered section, left and right sides adjacent to the connection side, and a distal end side, which is an opposed side of the connection side, and, among the sides, both the left and right sides are shorter than both of the connection side and the distal end side and piece width formed by a distance between the left and right sides gradually increases from a side of the connection side to a side of the distal end side.

12. The supplying method according to any one of claim 7, 8 or 9, wherein pull-pieces of the respective adhesive films are formed in a piece shape including four sides made up of a connection side connected to the covered section, left and right sides adjacent to the connection side, and a distal end side, which is an opposed side of the connection side, and, among the sides, both the left and right sides are shorter than both of the connection side and the distal end side and piece width formed by a distance between the left and right sides gradually increases from a side of the connection side to a side of the distal end side.

* * * * *